US012701097B2

(12) United States Patent
Choudhry et al.

(10) Patent No.: US 12,701,097 B2
(45) Date of Patent: Aug. 4, 2026

(54) REGIONAL NETWORK ADDRESS TRANSLATION GATEWAYS FOR CLOUD COMPUTING RESOURCES

(71) Applicant: Amazon Technologies, Inc., Seattle, WA (US)

(72) Inventors: Akshay Choudhry, Santal Clara, CA (US); Stewart Allen, Seattle, WA (US); Gregory Skoczek, Seattle, WA (US); Bilal Hassan Khan, Lynnwood, WA (US); Shay Grinberg, Seattle, WA (US); Eyal Zangi, Sammamish, WA (US); Charbel Douaihy, Seattle, WA (US); Harika Veeravalli, Seattle, WA (US); Ethan Joseph Torretta, Edmonds, WA (US); Joseph Elmar Magerramov, Bellevue, WA (US); Colin Harrison Brace, Seattle, WA (US); Anoop Dawani, Redmond, WA (US); Matthew Browne Barr, Arlington, VA (US); Jaikumar Bharat Banthia, Bothell, WA (US); Justin Mark Lorenz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 18/979,323

(22) Filed: Dec. 12, 2024

(65) Prior Publication Data

US 2026/0172388 A1    Jun. 18, 2026

(51) Int. Cl.
| | |
|---|---|
| *H04L 61/2514* | (2022.01) |
| *H04L 12/46* | (2006.01) |
| *H04L 12/66* | (2006.01) |

(52) U.S. Cl.
CPC ...... *H04L 61/2514* (2013.01); *H04L 12/4641* (2013.01); *H04L 12/66* (2013.01)

(58) Field of Classification Search
CPC .. H04L 61/2514; H04L 12/4641; H04L 12/66
See application file for complete search history.

(56) References Cited

U.S. PATENT DOCUMENTS

| | | |
|---|---|---|
| 10,749,808 B1 | 8/2020 | Maccarthaigh |
| 11,088,944 B2 | 8/2021 | Allen |

(Continued)

FOREIGN PATENT DOCUMENTS

| | | |
|---|---|---|
| CN | 116094923 A | 5/2023 |
| CN | 117896424 A | 4/2024 |

OTHER PUBLICATIONS

U.S. Appl. No. 18/979,330, filed Dec. 17, 2024, Andrew Tandoc.

(Continued)

*Primary Examiner* — Benjamin M Thieu
(74) *Attorney, Agent, or Firm* — Robert C. Kowert; Kowert, Hood, Munyon, Rankin & Goetzel, P.C.

(57) ABSTRACT

A regional network address translation gateway (RNG) is established for traffic of a virtual private cloud (VPC) of a customer of a cloud computing environment. In response to detecting that an application resource has been activated in an availability zone (AZ) of a region for which the RNG is established, and that the RNG does not include resources for processing traffic of that AZ, a set of resources is allocated to the RNG for traffic of the AZ. The set of resources of the RNG is used to cause a network address assigned to the RNG to be set as a source address of a packet originating at the application resource before the packet is delivered to a destination.

20 Claims, 9 Drawing Sheets

(56)     References Cited

U.S. PATENT DOCUMENTS

| | | | |
|---|---|---|---|
| 12,028,311 | B2 | 7/2024 | Goodwin |
| 2018/0026877 | A1* | 1/2018 | Mysyk ............... H04L 63/0272 |
| | | | 709/206 |
| 2018/0041443 | A1 | 2/2018 | Xiao |
| 2020/0412608 | A1* | 12/2020 | Dunbar .............. H04L 41/0806 |
| 2021/0044540 | A1* | 2/2021 | Rushton ................. G06F 9/505 |
| 2025/0350493 | A1* | 11/2025 | Wei ......................... H04L 41/26 |
| 2025/0379845 | A1* | 12/2025 | Zhang ..................... H04L 12/66 |

OTHER PUBLICATIONS

International Search Report and Written Opinion mailed Apr. 8, 2026 in PCT/US2025/057919, Amazon Technologies, Inc., 14 pages.
Daniel Neri, et al: "Introducing Amazon VPC Regional NAT Gateway: Networking & Content Delivery," Nov. 20, 2025, pp. 1-11; Retrieved from the Internet: URL:https://aws.amazon.com/blogs/networking-and-content-delivery/introducing-amazonvpc-regional-nat-gateway/.
Anonymous; "Amazon Virtual Private Cloud User Guide—first 400 pages," Mar. 6, 2024; Retrieved from the Internet: URL:https://web.archive.org/web/20240309100057/https://docs.aws.amazon.com/pdfs/vpc/latest/userguide/vpc-ug.pdf#what-is-amazon-vpc.

* cited by examiner

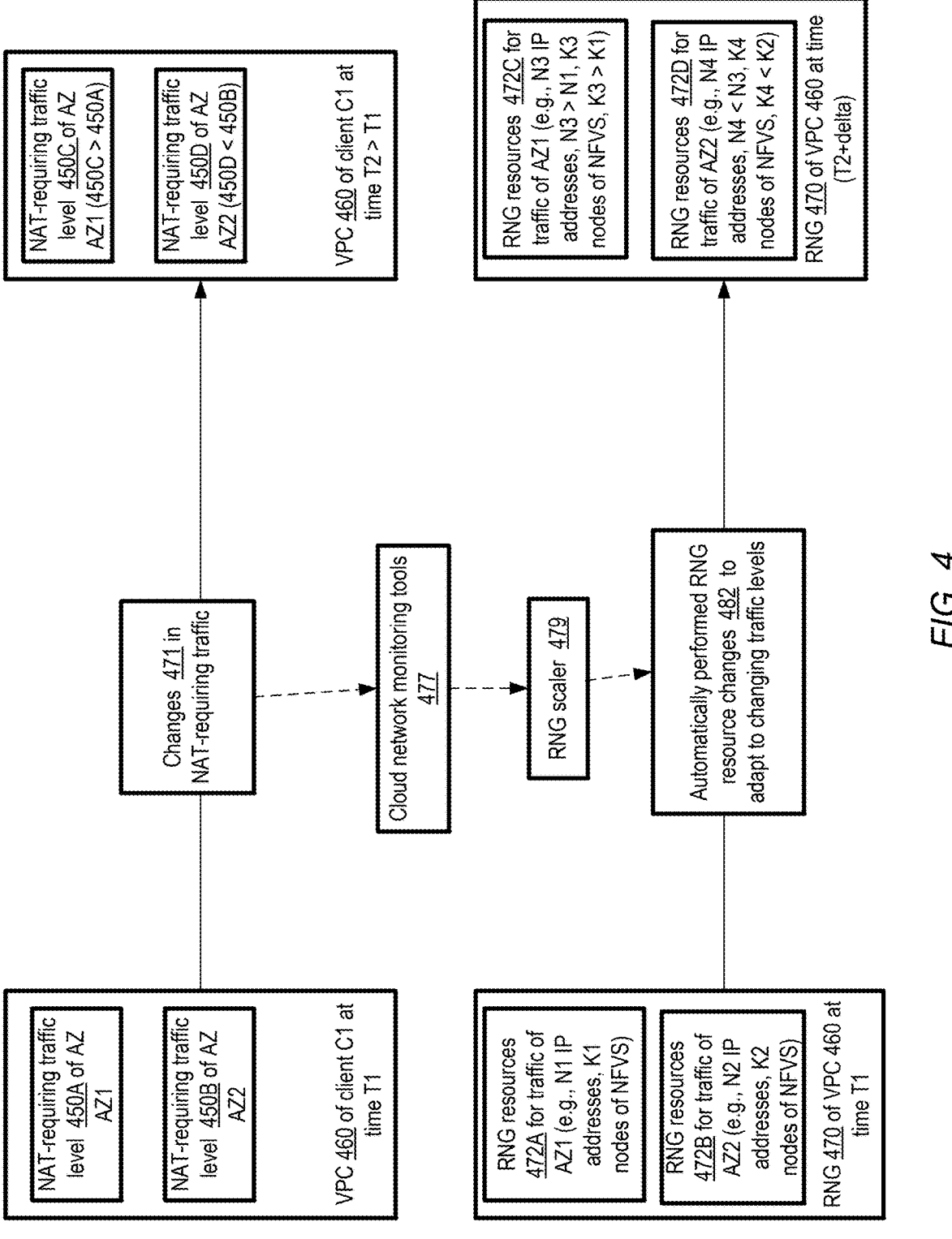

NAT-requiring traffic level 450C of AZ AZ1 (450C > 450A)

NAT-requiring traffic level 450D of AZ AZ2 (450D < 450B)

VPC 460 of client C1 at time T2 > T1

RNG resources 472C for traffic of AZ1 (e.g., N3 IP addresses, N3 > N1, K3 nodes of NFVS, K3 > K1)

RNG resources 472D for traffic of AZ2 (e.g., N4 IP addresses, N4 < N3, K4 nodes of NFVS, K4 < K2)

RNG 470 of VPC 460 at time (T2+delta)

Changes 471 in NAT-requiring traffic

Cloud network monitoring tools 477

RNG scaler 479

Automatically performed RNG resource changes 482 to adapt to changing traffic levels NAT-requiring traffic level 450A of AZ AZ1

NAT-requiring traffic level 450B of AZ AZ2

VPC 460 of client C1 at time T1

RNG resources 472A for traffic of AZ1 (e.g., N1 IP addresses, K1 nodes of NFVS)

RNG resources 472B for traffic of AZ2 (e.g., N2 IP addresses, K2 nodes of NFVS)

RNG 470 of VPC 460 at time T1

FIG. 4

Create, e.g., at a virtualized computing service (VCS) of a cloud provider network distributed across multiple regions, with each region comprising a set of availability zones (AZs), a regional NAT gateway (RNG1) to be used for routing a given region R1's traffic of a virtual private cloud (VPC1) of a customer C1 whose customer application resources (e.g., compute instances) may be spread across multiple AZs; C1 does not have to request AZ-specific NGs or specify details such as a subnet for RNG1    801

Detect, e.g., by VCS configuration managers, when customer C1 application resource (AR1) (e.g. a compute instance) of VPC1 is activated/launched in a particular AZ AZ1 at which RNG1 resources have not yet been assigned/allocated    804

Automatically allocate AZ1-specific RNG1 resources RR1, which are not exposed to the customer C1(e.g., nodes of a network function virtualization service (NFVS) of the cloud provider network, virtual network interfaces (VNIs), network address(es) to be substituted for source addresses when performing NAT)    807

Automatically generate and store routing metadata if required (the requirement may be determined based on existing routing metadata) such that network packets sent to a set of destinations from AR1 are transmitted via RNG1    810

RNG1 utilizes RR1 resources to cause a particular network address of RNG1 to be set as a source address of a packet originating at AR1 prior to delivery of the packet to its destination
813

Configuration managers of VCS automatically expand RNG1 resources to deal with increasing traffic levels of the VPC and/or when new application resources are added in various AZs, contract RNG1 resources in scenarios when existing capacity is no longer needed, and maintain zonal affinity by routing traffic through local-AZ RNG1 resources    816

*FIG. 8*

REGIONAL NETWORK ADDRESS TRANSLATION GATEWAYS FOR CLOUD COMPUTING RESOURCES

BACKGROUND

Cloud provider networks provide an extensive array of virtualized computing and networking features. For example, isolated virtual networks referred to as virtual private clouds (VPCs) can be established to host various types of customer applications running on virtual machines or compute instances, and networking components such as virtual gateways can be configured to perform packet processing tasks such as network address translation associated with the applications. Configuring networking components can become challenging as customer workloads grow across multiple cloud locations.

BRIEF DESCRIPTION OF DRAWINGS

FIG. 4 illustrates an example scaling of RNG resources within availability zones based on automated detection of workload metrics, according to at least some embodiments.

FIG. 8 is a flow diagram illustrating aspects of operations, pertaining to configuration and use of RNGs, which may be performed at a cloud provider network, according to at least some embodiments.

Figure 1:
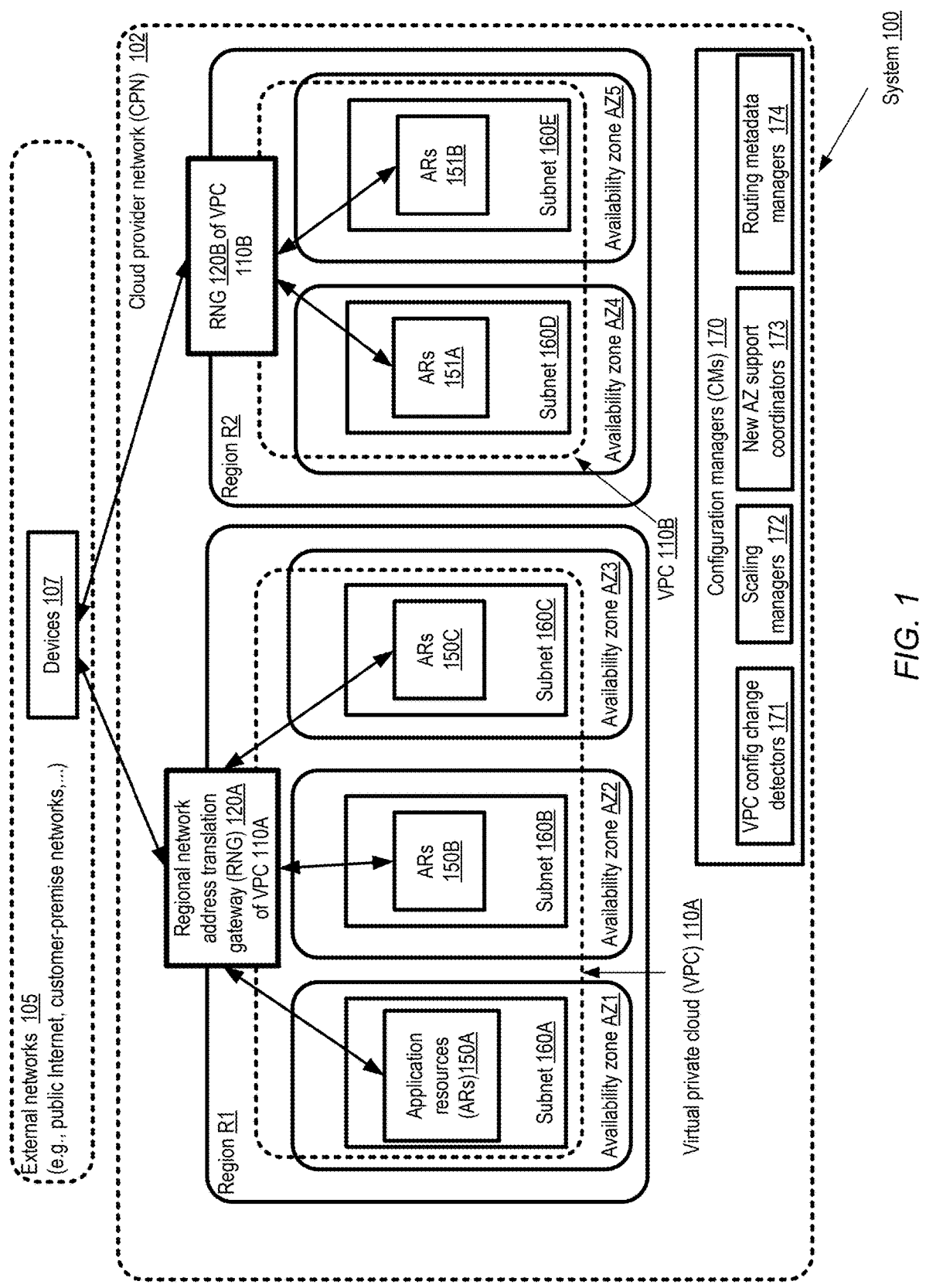
FIG. 1 illustrates an example system environment in which dynamically adaptive regional network address translation gateways (RNGs) may be configured for virtual private cloud (VPCs) of a cloud provider network, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

In modern cloud computing environments, network address translation (NAT) is essential for allowing private network resources to access the Internet securely. However, traditional NAT solutions often require complex configuration and management across multiple availability zones, leading to potential misrouting, reduced availability, and increased operational overhead. As organizations expand their cloud footprints, the challenge of maintaining efficient and reliable NAT services across a growing infrastructure becomes increasingly difficult.

The present disclosure addresses these challenges by introducing a regional NAT gateway (RNG) that provides a single, unified NAT solution across multiple availability zones within a virtual private cloud (VPC). This innovative approach automatically expands and retracts NAT services as workloads grow or shrink, eliminating the need for manual configuration in each zone. By simplifying routing, improving availability, and reducing the risk of human error, the RNG significantly enhances the scalability and reliability of cloud networking. Furthermore, its ability to automatically scale to accommodate high throughput and large numbers of concurrent connections ensures optimal performance even during peak usage periods.

A cloud provider network or cloud computing environment can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high-speed network, for example a fiber communication connection. An availability zone (AZ) (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time.

On behalf of customers or clients of a virtualized computing service (VCS) of a cloud provider network, isolated virtual networks referred to as VPCs can be established. A VPC can comprise a collection of networked resources (including, for example, customer application resources such as compute instances or virtual machines) allocated to a given VCS customer, which are logically isolated from (and by default, inaccessible from) resources allocated for other customers in other VPCs. The customer on whose behalf a VPC is established can be granted substantial flexibility regarding network configuration for the resources of the VPC—e.g., private Internet Protocol (IP) addresses for compute instances may be selected by the customer without having to consider the possibility that other resources within other VPCs may have been assigned the same IP addresses, subnets may be established within the VPC, security rules (sometimes referred to as security groups) may be set up for incoming and outgoing traffic with respect to the VPC, and so on. Customer application resources (such as compute instances or virtual machines) within a VPC can be dynamically created, re-configured or deleted. VPC resources can be spread across multiple AZs as desired by the customer—for example, a customer can initially use compute instances within a first AZ to run an application, and then decide to run a portion of the application (e.g., in response to increasing workload levels and/or for availability reasons) within other AZs in the same region or in different regions.

According to techniques introduced in the present disclosure, a single RNG can be established or created for traffic associated with a VPC of a customer of a cloud provider network, without requiring the customer to request establishment of AZ-specific NAT gateways, regardless of the number of AZs within which application resources of the customer's VPC currently or eventually run. A configuration manager of the cloud provider network can automatically detect when an application resource such as a compute instance has been launched or activated at a cloud server (e.g., a virtualization host of a VCS) within a particular AZ, and determine whether the RNG already has resources (which can be referred to as gateway resources to distinguish them from the customer's application resources) allocated within that AZ for performing network address translation. In response to detecting that the RNG does not currently have gateway resources for the AZ, a set of AZ-specific resources (such as nodes of a distributed network function virtualization service (NFVS) of the cloud computing environment) can be added to the gateway resources to process at least a portion of VPC traffic of the AZ which requires NAT. In addition, if required, routing metadata can be automatically generated and stored such that network packets directed to a set of destinations within the public Internet from the customer's newly activated application resource are transmitted via the RNG. The resources allocated to the RNG for the AZ can then be used to perform the desired NAT operations, e.g., by setting a source address of a packet which originates at the application resource to an IP address of the RNG itself.

As and when the customer activates application resources of the VPC within additional AZs, the configuration manager can automatically and transparently (e.g., without informing the customer) add more RNG resources to handle the VPC traffic of the additional AZs. Similarly, if the customer decides to reduce the application resources being used, for example such that no application resources remain within a given AZ, the configuration manager can also cut back on the corresponding RNG resources. In addition, as VPC traffic levels increase within a given AZ, the configuration manager can ramp up the RNG resources (e.g., by allocating additional NFVS nodes, by assigning additional IP addresses to the RNG to avoid running out of ports for address translation, etc.) specific to that AZ. The customer need not be concerned with the details of the adaptations performed automatically for their RNG, and in at least some cases operations performed for dynamic RNG modification in light of changing customer workloads may not be revealed to the customer. At the same time, the customer can in some cases influence or direct the RNG operations, e.g., by providing a set or range of "white-listed" IP addresses that should preferably be used as RNG addresses for address translation purposes.

As one skilled in the art will appreciate in light of this disclosure, certain embodiments may be capable of achieving various advantages, including some or all of the following: (a) considerably simplifying the configuration of cloud resources such as gateways that are used for NAT, thereby reducing the risk of human error with respect to NAT operations and reducing the time taken to bring up customer applications which require NAT; (b) improving availability of cloud-based NAT functionality; and/or (c) improving the scalability and reliability of cloud networking operations.

According to some embodiments, a system may include a distributed configuration manager (CM) of a cloud computing environment or cloud provider network, and a set of servers of the cloud computing environment. The cloud computing environment may be distributed across multiple geographical regions, individual ones of which may in turn include one or more AZs, with each AZ in turn comprising at least a portion of a data center. The CM, which may be implemented using software and hardware of one or more computing devices, may create or establish an RNG for traffic associated with a VPC of a customer of the cloud computing environment in various embodiments, without for example requiring the customer to request establishment of AZ-specific NAT gateways. The CM may detect that an application resource (AR) (such as a VCS compute instance) has been activated or launched, e.g., using a server of the set of servers of the cloud computing environment on behalf of the customer, in at least some embodiments. The AR may, for example, be configured within a private subnet of the VPC (e.g., a subnet within which application resources are assigned at least some IP addresses that are not advertised on the public Internet), and the private subnet may in turn be configured within a particular AZ.

In response to detecting the activation of the AR in that AZ, the CM may determine whether the RNG already includes resources (e.g., network function virtualization service (NFVS) nodes that can implement NAT operations, IP addresses to be used for the translated versions of addresses, virtual network interfaces which can be used as route targets, etc.) that can be used for processing traffic of that AZ for the customer's VPC in various embodiments. If the RNG does not already have such resources, a set of availability zone-specific resources (which may be referred to as gateway resources) may be allocated or assigned to the RNG to process VPC traffic of the AZ on behalf of the customer in at least some embodiments. In one embodiment, in addition to allocating/assigning RNG resources, the CM may also cause routing metadata to be automatically generated and stored such that network packets directed to a set of destinations from the newly-activated application resource is sent via the RNG. In some embodiments, the routing metadata may only be generated if some conditions are met, e.g., if a property of the AR (such as whether the AR is already assigned a public IP version 4 (IPV4) address which is advertised on the public Internet, or whether a route has already been set up for traffic from the AZ to a set of destinations) indicates that additional routing metadata is needed to route the traffic of the AR correctly. In some embodiments, the routing metadata may be stored within a routing table that is not, at least by default, visible or accessible to the customer, such as a hidden routing table associated with a virtual network interface (VNI) which is programmatically attached to the AR. VNIs (also referred to as elastic network interfaces or ENIs) are groups of networking properties (e.g., including IP addresses, subnet identifiers and the like) which can be programmatically attached and detached from compute instances and other cloud resources without having to change properties of physical network cards or physical network interfaces.

After the resources have been allocated or assigned for the RNG in the AZ in which the AR is configured, network address translation operations for traffic of the AR may be commenced in various embodiments. For example, using the allocated AZ-specific gateway resources, a particular network address of the RNG may be set as a source address of a packet originating at the AR prior to delivery of the packet to a destination. In at least some embodiments, a destination to which the packet originating at the APR may comprise an endpoint within the public Internet. In other embodiments, RNGs may also or instead be used for packets being sent to customer premise networks and/or to other VPCs.

In some embodiments, an RNG may be created or established in response to a programmatic request from the customer on whose behalf the VPC was set up. In at least one embodiment, the customer may specify, e.g., via a programmatic interface of the CM or the VCS of which the CM is a component, one or more IP addresses (or a range of IP addresses) which are to be used for NAT operations by the RNG (e.g., the addresses which are used to replace the original source addresses of packets which were generated at the AR).

According to various embodiments, the RNG may be scaled up or down automatically by the CM. For example, based at least in part on one or more metrics associated with traffic of the VPC, the CM may automatically allocate additional AZ-specific resources (such as NFVS nodes, IP addresses, and/or VNIs) to the RNG to process traffic of the same AZ. In one embodiment, additional IP addresses may be assigned for use by the RNG to avoid running out of source ports to be indicated in the translated versions of packets being processed at the RNG. For example, if the number of distinct source ports of a group of ARs from which traffic is being sent to the same destination in the public Internet (e.g., an Internet-based service which is in high demand) grows very large, and the number of RNG IP addresses which are available for the translated versions of the packets from those ARs to the destination is not increased, the RNG may run out of translated source ports. In order to deal with such scenarios, the number of AR source ports in use for individual destinations may be monitored in some embodiments, and new IP addresses may be assigned to the RNG if/when that number increases beyond a threshold for a given destination or set of destinations. In at least one embodiment, the CM may automatically scale down an RNG (e.g., free, remove or delete some resources that were earlier assigned to the RNG) in response to detecting that the VPC traffic no longer requires the resources. For example, if the customer no longer has active ARs of the VPC in a given AZ, the AZ-specific resources allocated/assigned to the RNG for that VPC and that AZ may be freed.

In some embodiments, a technique known as zone affinity may be implemented at RNGs to ensure that the highest possible performance is achieved for NAT operations. According to a zone affinity policy, when performing NAT operations via an RNG for packets of a particular AZ, the gateway resources of that RNG in that same AZ may be used as often as possible, even though it may be feasible to use RNG resources in another AZ. For example, the CM may assign respective sets of AZ-specific resources for individual ones of the AZs among which ARs of a VPC are distributed: gateway resources GR-1 in AZ1, gateway resources GR-2 in AZ2, etc. In accordance with the zonal affinity policy, GR-1 may be used (at least by default) for processing traffic of ARs in AZ1, GR-2 may be used (at least by default) for processing traffic of ARs in AZ2, and so on. Note that at least in some embodiments, if an error or failure prevents the use of gateway resources in the same AZ as the AR whose traffic is to be processed, gateway resources in other AZs may be used. In one embodiment, a customer may provide preferences via programmatic interfaces of the VCS or the CM, indicating whether zonal affinity is to be overridden for the customer's traffic, and if so under what circumstances the zonal affinity should be overridden, how gateway resources should instead be chosen, and so on.

In various embodiments, as indicated above, a CM may automatically detect the activation, launch, configuration or bring-up of ARs in various AZs of a VPC. A number of different approaches may be used for such detection. In one embodiment, for example, a CM may periodically (e.g., once every few seconds or every few minutes) scan the configuration information of the VPC to try to automatically discover relevant changes that may require RNG-related actions. In another embodiment, a CM may instead or also programmatically subscribe to a stream of VPC configuration change notifications, and learn about relevant changes based on such notifications.

As indicated earlier, in some embodiments, RNGs may be implemented at a cloud provider network. A cloud provider network or cloud computing environment (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

In some embodiments, customers can connect to AZs of one or more regions of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS of a cloud computing environment may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS may be implemented at one or more data centers, edge locations and/or extension locations of the provider network in different embodiments. A VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, NFVSs, database services, wide area networking (WAN) services and the like may also be implemented at the cloud provider network in some embodiments.

The traffic and operations of the cloud provider network (or individual services of the cloud provider network, including the VCS or a networking service at which RNGs are configured) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which dynamically adaptive regional network address translation gateways (RNGs) may be configured for virtual private cloud (VPCs) of a cloud provider network, according to at least some embodiments. As shown, system 100 may include resources and artifacts of a cloud provider network (CPN) 102 or cloud computing environment at which RNGs may be set up. The CPN may implement a virtualized computing service (VCS), which provides programmatic interfaces that can be used by customers to set up VPCs, such as VPC 110A and VPC 110B. Customer application resources (ARs) such as compute instances or virtual machines of a VPC may be activated, launched or configured within subnets associated with availability zones (AZs) in one or more regions of the cloud provider network. When defining or creating a subnet within a VPC using programmatic interfaces of the VCS, in various embodiments a customer may specify the AZ of the subnet (alternatively, the VCS control plane may select an AZ for the subnet if the customer does not specify an AZ).

In the scenario shown in FIG. 1, in response to programmatic requests from cloud customers or clients, within region R1, ARs 150A of VPC 110A may be configured in subnet 160A of availability zone AZ1, ARs 150B of VPC 110A may be activated in subnet 160B within availability zone AZ2, and ARs 150C of VPC 110A may be activated in subnet 160C within availability zone AZ3. Similarly, in region R2, ARs 151A of VPC 110B may be configured in subnet 160D within availability zone AZ4, while ARs 151B of VPC 110B may be activated in subnet 160E within availability zone AZ5. In at least one embodiment, a VCS may support establishment of multiple types of subnets including public subnets (whose resources are by default linked to an Internet gateway (IGW) for access to the Internet) and private subnets (whose resources are by default not linked to an Internet gateway for access to the Internet, and may require network address translation to communicate with devices 107 in the public Internet). One or more of the subnets shown in FIG. 1 may be a private subnet.

ARs 150 and 151 may need to communicate with devices 107 in networks external to the CPN 102 in the depicted embodiment. External networks 105 may, for example, comprise a portion of the public Internet, and/or a network set up at a premise of a customer of the CPN 102. In order to facilitate communication between the ARs and devices 107, a respective RNG may be set up for at least some VPCs set up on behalf of CPN customers by one or more distributed configuration managers (CMs) 170 of the CPN. A CM 170 may comprise software running at one or more computing devices in at least some embodiments. A CM 170 may comprise several subcomponents in the depicted embodiment, including VPC configuration change detectors 171, scaling managers 172, new AZ support coordinators 173, and routing metadata managers 174.

In at least one embodiment, a CM may create or establish an RNG, such as RNG 120A of VPC 110A or RNG 120B of VPC 110B in response to a programmatic request from a client (e.g., an administrator of the VPC for which the RNG is being set up). In various embodiments, the client may not have to request establishment of AZ-specific NAT gateways, or provide details such as a VPC subnet within which the NAT gateway should be set up; instead, the client may simply identify the VPC for which the RNG is to be set up, and the region for which the RNG is to be set up.

In the embodiment depicted in FIG. 1, at some point of time after an RNG is established, a CM 170 (e.g., using a VPC configuration change detector 171) may detect that an AR has been activated on behalf of the customer within a subnet within a particular AZ, and that the RNG does not currently include resources for processing traffic of that AZ. Accordingly, the CM may allocate (e.g., using a new AZ support coordinator 173) a set of AZ-specific resources to the RNG to process traffic of that AZ. AZ-specific resources may, for example, include one or more nodes of a network function virtualization service, one or more VNIs, one or more IP addresses and the like in different embodiments. The resources allocated for a given RNG may be referred to as gateway resources, e.g., to distinguish them from ARs. In addition to configuring or allocating gateway resources for the AZ, in at least one embodiment, the CM may cause (e.g., using a routing metadata manager 174) a set of routing metadata to be automatically generated and stored, such that packets directed from the recently-activated AR to one or more destinations such as devices 107 in an external network 105 are sent via the RNG. In one embodiment, the CM may examine one or more properties of the recently-activated AR to determine whether generation of the routing metadata is needed (for example, in some cases, the customer on whose behalf the AR is activated may already have set up a route enabling traffic to be routed correctly from the AR, so additional routing metadata may not be required).

After the AZ-specific gateway resources have been set up, and routing metadata has been stored in the appropriate VPC routing table (e.g., a routing table that is not necessarily exposed to or accessible by the customer), traffic may begin to flow between the AR and the devices 107 in the external network. The RNG may utilize the AZ-specific gateway resources to cause a particular IP address of the RNG to be set as a source address of a packet originating at the AR prior to delivery of the packet to a destination device 107 in various embodiments. For example, one or more NFVS nodes of the RNG within or associated with the AZ may change the source address in at least some embodiments, and the RNG IP address used for the modified version of address may be among the AZ-specific gateway resources that were allocated by the CM.

In at least some embodiments, a CM 170 may monitor various metrics of the RNG, including for example the amount or rate of traffic flowing via the RNG in either direction (from ARs to one or more external network devices 107, and/or from the external network devices to the ARs) in various AZs. As the workload changes, scaling managers 172 of a CM may automatically allocate more AZ-specific resources to the RNG, or in some cases free up some AZ-specific resources if they appear to no longer be needed. The customer may not need to be concerned with acquiring or allocating resources at the AZ level, and may not need to be concerned about modifying NAT gateway resources in response to workload changes in various embodiments.

Figure 2:
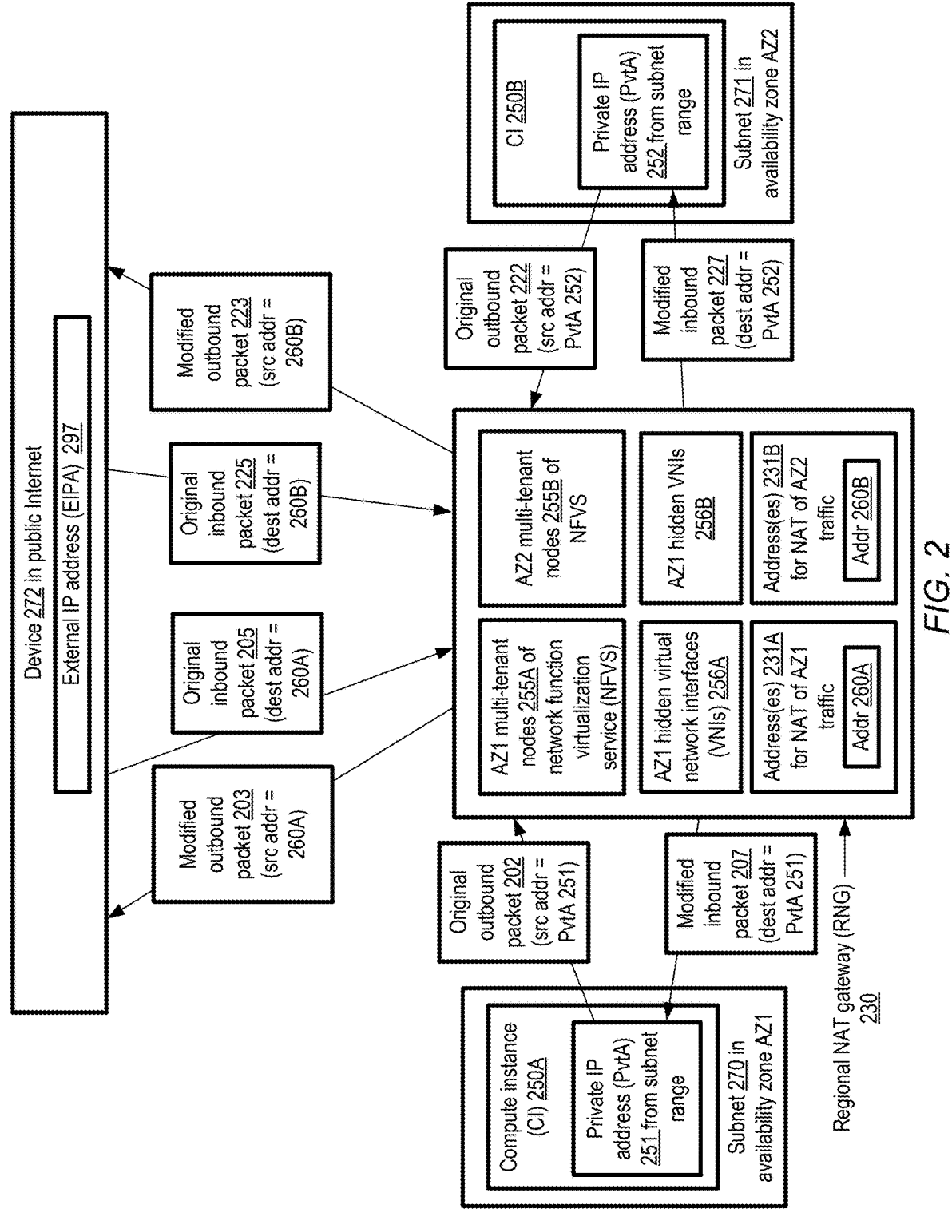
FIG. 2 illustrates examples of packet flows, originating at compute instances in distinct availability zones within a VPC, which are processed using an RNG, according to at least some embodiments.

FIG. 2 illustrates examples of packet flows, originating at compute instances in distinct availability zones within a VPC, which are processed using an RNG, according to at least some embodiments. In the embodiment depicted in FIG. 2, an RNG 230 set up by a configuration manager of a cloud computing network for a customer's VPC may comprise AZ-specific gateway resources for two AZs, AZ1 and AZ2. AZ1 gateway resources may comprise AZ1 multi-tenant nodes 255A of an NFVS, AZ1 hidden VNIs 256A, and addresses 231A for performing NAT of AZ1 traffic, including address 260A. AZ2 gateway resources of RNG 230 may comprise AZ2 multi-tenant nodes 255B of the NFVS, AZ2 hidden VNIs 256B, and addresses 231B for performing NAT of AZ2 traffic, including address 260B.

The application resources (ARs) for whose packets NAT is to be performed in the depicted embodiment using RNG 230 may comprise at least a pair of compute instances (CIs). CI 250A may have been assigned (e.g., by the customer) private IP address (PvtA) 251 from a CIDR (Classless Inter-Domain Routing) block chosen as a subnet address range for subnet 270 in AZ1. CI 250B may have been assigned (e.g., by the customer) private IP address (PvtA) 252 from a CIDR (Classless Inter-Domain Routing) block chosen as a subnet address range for subnet 271 in AZ2.

In the example scenario of FIG. 2, the term "outbound" refers to packets flowing from the cloud provider network to the public Internet, and the term "inbound" refers to packets flowing from the public Internet to the cloud provider network. Based at least in part on routing metadata generated by the configuration manager, an original outbound packet 202 directed from CI 250A to a device 272 in the public Internet with external IP address (EIPA) 297 may first be sent to a node 255A of the AZ1 gateway resources of RNG 230 in the depicted embodiment. In at least one embodiment, the routing metadata may for example indicate a hidden VNI 256A as a target for traffic being sent to the public Internet. In some embodiments, the routing metadata may comprise a route table entry within a hidden routing table used for a VNI which is programmatically attached to the CI 250A. The NFVS node may modify the outbound packet 202, and set a source address of the corresponding modified outbound packet 203 to 260A, one of the addresses assigned to RNG 230 for traffic of AZ1 in the depicted embodiment.

In at least some embodiments, device 272 may send a response to the outbound packet 203, comprising original inbound packet 205 with the destination address set to 260A. At the NFVS nodes 255A, the original inbound packet may be transformed into modified inbound packet 207, which has the private IP address PvtA 251 as the destination, and sent to CI 250A.

Similarly, based at least in part on additional routing metadata generated by the configuration manager, an original outbound packet 222 directed from CI 250B to device 272 in the public Internet with EIPA 297 may first be sent to a node 255B of the AZ2 gateway resources of RNG 230 in the depicted embodiment. In at least one embodiment, the routing metadata may for example indicate a hidden VNI 256B as a target for traffic being sent to the public Internet. In some embodiments, the routing metadata may comprise a route table entry within a hidden routing table used for a VNI which is programmatically attached to the CI 250B. The NFVS node may modify the outbound packet 222, and set a source address of the corresponding modified outbound packet 223 to 260B, one of the addresses assigned to RNG 230 for traffic of AZ2 in the depicted embodiment.

Device 272 may send a response to the outbound packet 223 in some embodiments, comprising original inbound packet 225 with the destination address set to 260B. At the NFVS nodes 255B, the original inbound packet may be transformed into modified inbound packet 227, which has the private IP address PvtA 252 as the destination, and sent to CI 250B.

In the embodiment depicted in FIG. 2, the customer on whose behalf the RNG 230 is created may not have access to the internal components of the RNG. For example, the customer may not be aware of any of the AZ-specific resources of RNG 230. In addition, in at least some embodiments, the customer may not be aware of, or have access to, routing metadata which causes packets from the customer's CIs to flow correctly to and from their destinations in the public Internet after address translation via the RNG. By default, in at least some embodiments, for customer traffic originating at (or directed to) a particular AZ, the RNG may utilize gateway resources in the same AZ, as this may result in faster NAT operations than if the NAT operations were performed using resources in some other AZ (which would potentially increase latencies as the packets may have to be transmitted further). This approach of using gateway resources within the same AZ as the sources/destinations of traffic may be referred to as zone affinity in some embodiments.

Figure 3:
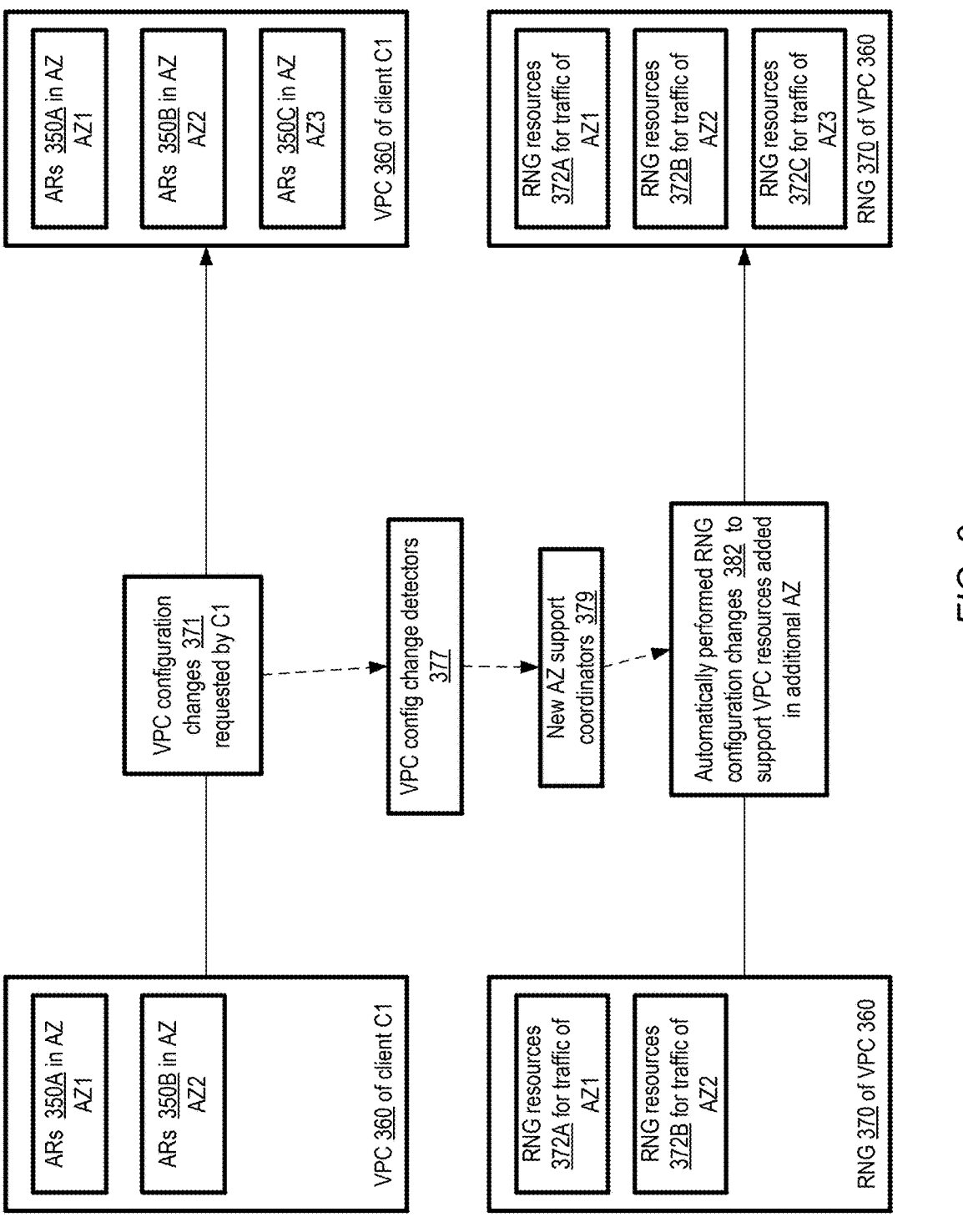
FIG. 3 illustrates an example expansion of RNG resources to additional availability zones based on automated detection of activation of customer resources in availability zones which were previously not being used by the customer, according to at least some embodiments.

FIG. 3 illustrates an example expansion of RNG resources to additional availability zones based on automated detection of activation of customer resources in availability zones which were previously not being used by the customer, according to at least some embodiments. In the example scenario shown, a VPC 360 of a client Cl of a VCS may have application resources activated in two AZs of a region at a particular point in time: ARs 350A in AZ AZ1, and ARS 350B in AZ AZ2. Accordingly, at that point in time, RNG 370 set up for VPC 360 may comprise RNG resources 372A for traffic of AZ1 and RNG resources 372B for traffic of AZ2.

VPC configuration changes 371 requested by client C1 may result in activation of additional ARs 350C in AZ AZ3 in the depicted embodiment. For example, such client-requested configuration changes may comprise launch requests for new compute instances, requests to execute functions of a server-less dynamically provisioned computing service (sometimes referred to as a Lambda service) of the cloud computing environment, requests to execute software containers at a serverless container management service of the cloud computing environment, and so on.

In at least some embodiments, VPC configuration change detectors 377 (e.g., components of configuration managers used for RNGs) may automatically detect the changes 371, without for example requiring the customer to explicitly inform the VCS that changes may be required in RNG configuration. New AZ support coordinators 379 (e.g., components of the configuration managers) may determine that currently RNG 370 does not gateway resources for processing traffic of AZ3, and cause RNG resources 372C to be allocated as part of automatically performed RNG configuration changes 382 in the depicted embodiment. As a result, RNG 370 may include resources for processing traffic of all the AZs in which ARs of VPC are activated.

Any of a number of techniques may be used to detect VPC configuration changes that may lead to RNG configuration changes in different embodiments. For example, in some embodiments, VPC configuration change detectors 377 may periodically (e.g., once every few minutes) scan configuration information of the VPC, stored for example in the VCS control plane. In other embodiments, VPC configuration change detectors 377 may subscribe to a stream of VPC configuration change notifications via one or more VCS control plane programmatic interfaces, and be notified whenever a VPC configuration change occurs. Note that in general numerous types of VPC configuration changes may be performed at the request of the customer on whose behalf the VPC is set up, and only a few such changes may lead to RNG configuration changes; as such, the totality of VPC configuration changes may be filtered by the VPC configuration change detectors 377 in various embodiments to discern changes that may require RNG configuration changes. In at least some embodiments, there may be short time intervals (e.g., a few minutes) between activation of an AR in a new AZ, and the allocation of RNG resources in that new AZ. During such intervals, in one embodiment, the existing RNG resources in other AZs may be used for translating the addresses of any traffic that may originate at, or be directed to, the AR.

In at least some embodiments, RNG configuration managers of a cloud provider network may respond not only to detections of ARs in AZs which were not being used earlier, but also to the termination of the use of one or more AZs for ARs. For example, if after some time, the ARs 350 in any given AZ are terminated or freed, such that VPC 360 no longer has any active resources in a given AZ, the corresponding RNG resources in that AZ may automatically be freed in such embodiments. As such, the configuration managers may automatically expand and contract the set of AZ-specific RNG resources based on how many different AZs are being used for ARs of the VPC for which the RNG was set up.

FIG. 4 illustrates an example scaling of RNG resources within availability zones based on automated detection of workload metrics, according to at least some embodiments. In the depicted example scenario, a VPC 460 of a client C1 of a cloud provider network may comprise one or more ARs in two AZs of a region: AZ1 and AZ2, and an RNG 470 may have been created for the VPC. The ARs may generate (and/or receive) NAT-requiring traffic (packet flows for which network address is required, such as packets flowing between the ARs and devices in the public Internet). Metrics of the levels of the NAT-requiring traffic (e.g., how many connections are opened per second, how many packets are sent in either direction per second, how many Transmission Control Protocol (TCP) ports have been used for various TCP connections, and so on) may be gathered with respect to each AZ, e.g., using a monitoring service of the cloud provider network or other tools/services in various embodiments.

At time T1, NAT-requiring traffic level 450A may exist with respect to VPC 460's ARs in AZ1, and NAT-requiring traffic level 450B may exist with respect to VPC 460's ARs in AZ2. RNG resources 472A for traffic of AZ1 may, for example, include N1 IP addresses and K1 nodes of an NFVS. RNG resources 472B for traffic of AZ2 may, for example, include N2 IP addresses and K2 nodes of an NFVS.

Over time, the application workload level may change at the ARs in one or both AZs AZ1 and AZ2 in the depicted embodiment. This may result in corresponding changes 471 in NAT-requiring traffic, which may be detected by cloud network monitoring tools/service 477. For example, at some time T2 after T1, the NAT-requiring traffic level 450C of AZ AZ1 may be higher than the level 450A which existed at T1, while the NAT-requiring traffic level 450D of AZ AZ2 may be lower than the level 450B which existed at T1.

Data about the changing traffic levels may be obtained at a configuration manager, e.g., at an RNG scaler 479 component of a configuration manager in some embodiments. In at least one embodiment, before adjusting the gateways resources of RNG 470, the RNG scaler may verify that the trends in traffic change are persistent and not just transient fluctuations (e.g., traffic metrics collected over some time period delta may be analyzed by RNG scaler 479). Automatically performed RNG resource changes 482 to adapt to changing traffic levels may, for example, include increases/decreases in the number of NFVS nodes assigned for individual AZs, and/or increases/decreases in the number of IP addresses assigned to the RNG for address translation in individual AZs. At time (T2+delta), for example, in response to a sustained increase in traffic of AZ1, RNG resources 472C for AZ1 may include N3 IP addresses, where N3>N1, and/or K3 NFVS nodes, where K3>K1. Similarly, in response to a sustained decrease in traffic of AZ2, RNG resources 472D for AZ2 at time (T2+delta) may include N4 IP addresses, where N4<N2, and/or K4 NFVS nodes, where K4<K2.

Figure 5:
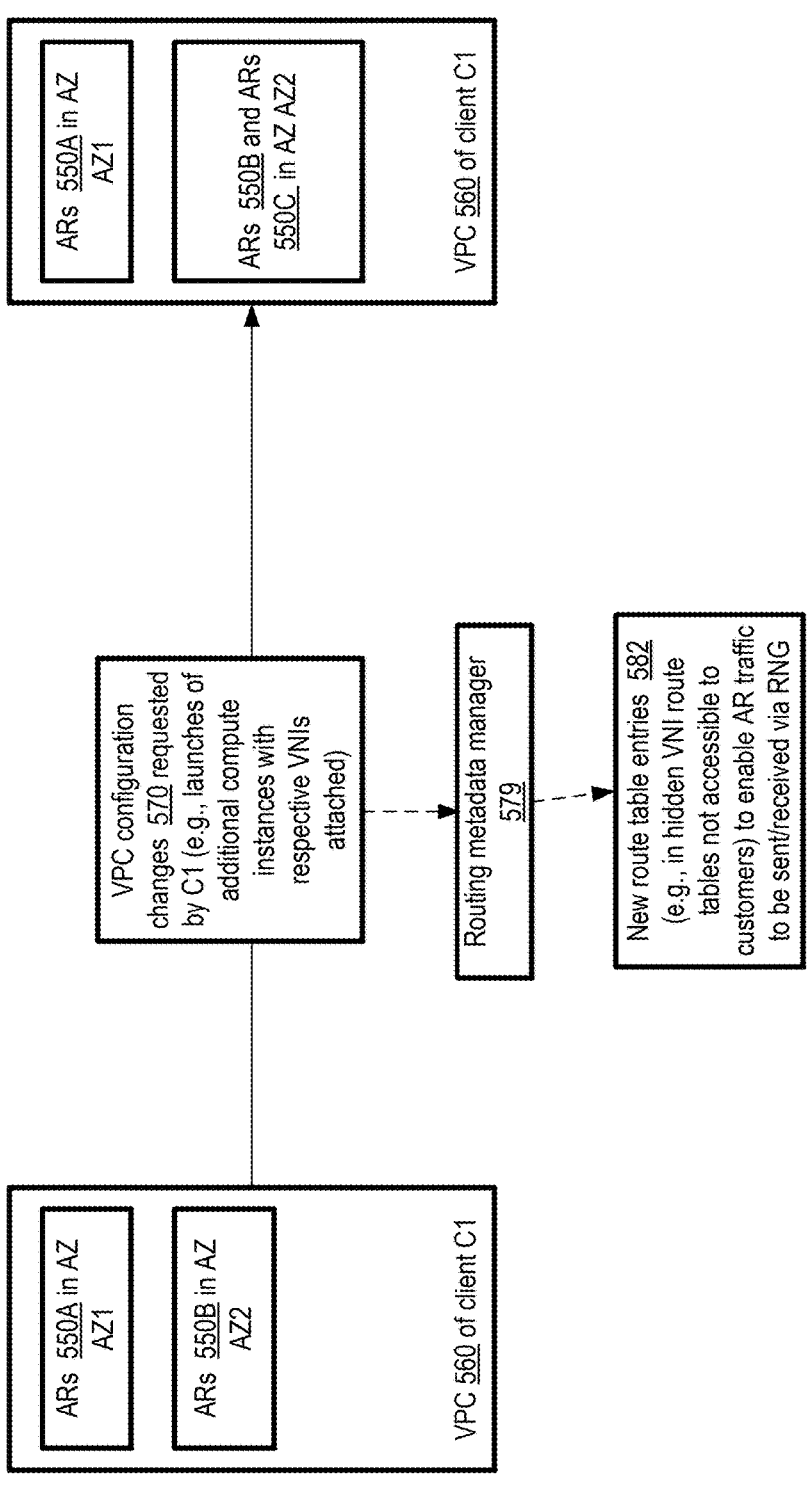
FIG. 5 illustrates an example of automated generation of routing metadata for packets that are to be transmitted via an RNG, according to at least some embodiments.

FIG. 5 illustrates an example of automated generation of routing metadata for packets that are to be transmitted via an RNG, according to at least some embodiments. In the depicted embodiment, a VPC 560 of a client C1, for which an RNG has been set up, may comprise ARs in two AZs of a given region: ARs 550A in AZ1 and ARs 550B in AZ2. Client C1 may at some point increase the number of ARs in one or more AZs of VPC 560. For example, VPC configuration changes 570 requested by C1 may include the launch or establishment of one or more compute instances in a subnet within AZ2, with respective VNIs programmatically attached to individual compute instances. ARs 550C created as a result of the configuration changes 570 may not initially, at least by default, have routes set up for traffic that is to flow between the ARs and network endpoints external to the VPC 560.

In the embodiment shown in FIG. 5, a configuration manager of a cloud provider network may comprise a routing metadata manager 579. The routing metadata manager may examine existing routing information of the VPC to determine whether any additional routes need to be set up to enable traffic of the added ARs 550C to be sent via the RNG to external endpoints in various embodiments. Under certain conditions, for example if client C1 has already set up route table entries for the added ARs, or if IP v4 public addresses are already assigned to individual ones of the added ARs, there may not be a need for more routing metadata in some embodiments. If the routing metadata manger 579 determines that more such routing metadata is required, it may generate and store such routing metadata in one or more route tables in the depicted embodiment. Such new route table entries 582 may, in some embodiments, be inserted into hidden VNI route tables that are not accessible to clients or customers, at least by default (e.g., route tables that are created by configuration managers and associated with VNIs attached to the added ARs). In some embodiments, a target of such a route table entry may comprise an identifier of a VNI associated with the RNG. In some embodiments, a target of such a route table entry may comprise an identifier of a logical pool of VNIs associated with the RNG, and the networking infrastructure of the cloud computing environment may map the logical pool identifier to an identifier of a specific VNI in the same AZ (e.g., AZ2) as the ARs that have been added to the VPC.

Figure 6:
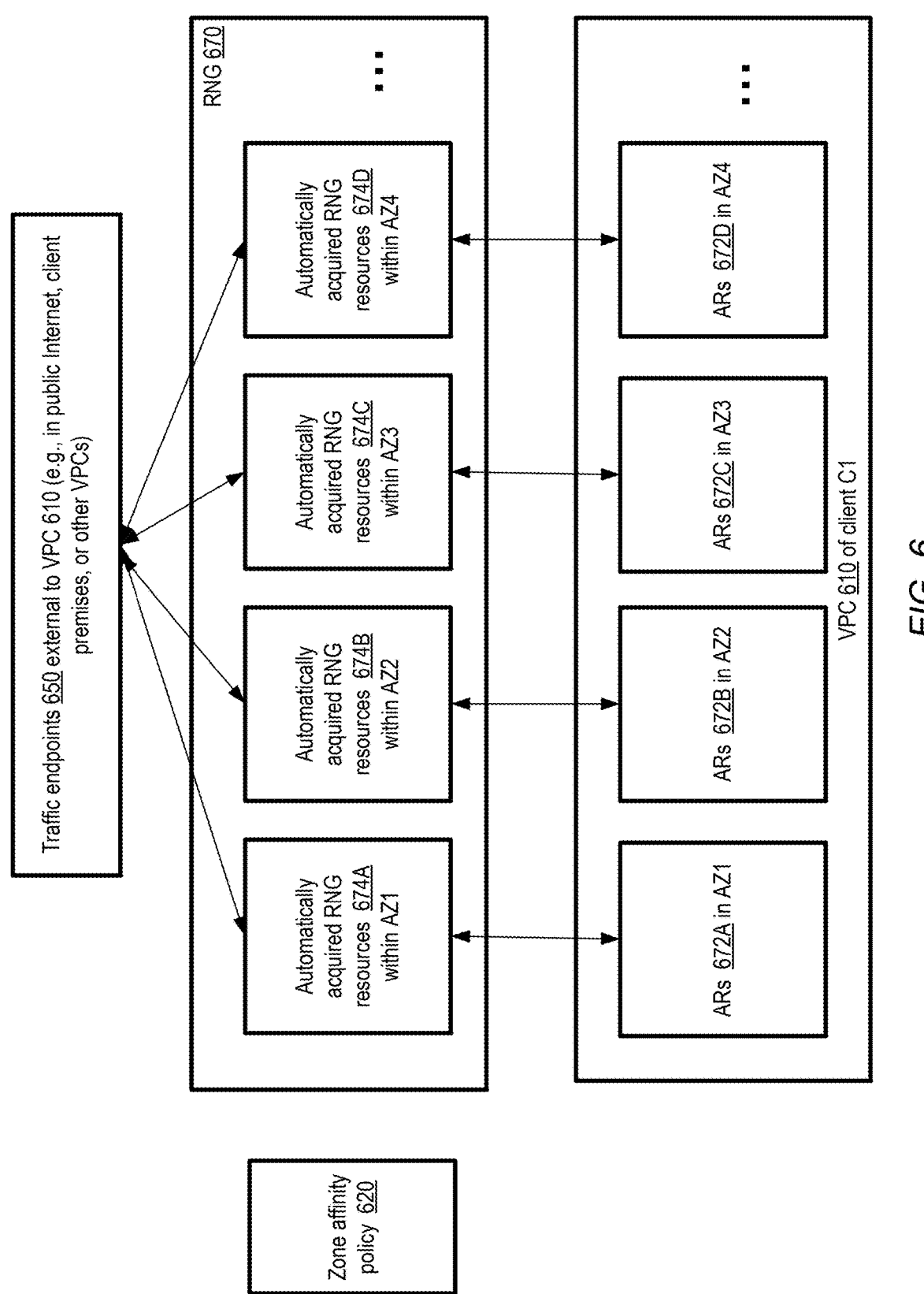
FIG. 6 illustrates an example of implementation of a zone affinity policy with respect to an RNG, according to at least some embodiments.

FIG. 6 illustrates an example of implementation of a zone affinity policy with respect to an RNG, according to at least some embodiments. In various embodiments, for performance and other reasons, RNG resources that are in the same AZ as the ARs whose traffic requires address translation may, at least by default, be used in preference to RNG resources in other AZs in accordance with a default zone affinity policy 620. In the example scenario shown in FIG. 6, a VPC 610 of a client C1 of a cloud computing environment may comprise application resources in numerous AZs of a given region, such as ARs 672A in AZ1, AEs 672B in AZ2, ARs 672C in AZ3, and ARs 672D in AZ4.

An RNG 670 may have been created for VPC 610 in the depicted embodiment, comprising gateway resources in multiple AZs of the region. For example, RNG 670 may comprise automatically acquired RNG resources 674A in AZ1, automatically acquired RNG resources 674B in AZ2, automatically acquired RNG resources 674C in AZ3, and automatically acquired RNG resources 674D in AZ4. The RNG resources (such as NDVS nodes, IP addresses, VNIs, etc.) may have been automatically acquired based on detection of establishment of ARs in individual AZs as discussed above.

According to a default version of zone affinity policy 620, under normal operating conditions (e.g., in the absence of failure or network partitions) RNG resources in the same AZ as the AR whose packets require address translation may be used for packet flows between the AR and a set of traffic endpoints 650 external to VPC 610 in the depicted embodiment. If RNG resources in the same AZ are unavailable, e.g., due to failures of NFVS nodes, the default zone affinity policy may indicate which other AZ's RNG resources should be used (if any) or if traffic should simply be dropped. In at least some embodiments, a client may indicate zone affinity preferences to configuration managers of the RNGs via programmatic interfaces. Client-supplied affinity preferences may indicate, for example, which specific alternative AZs are preferred if a given AZ's RNG resources become unavailable.

Figure 7:
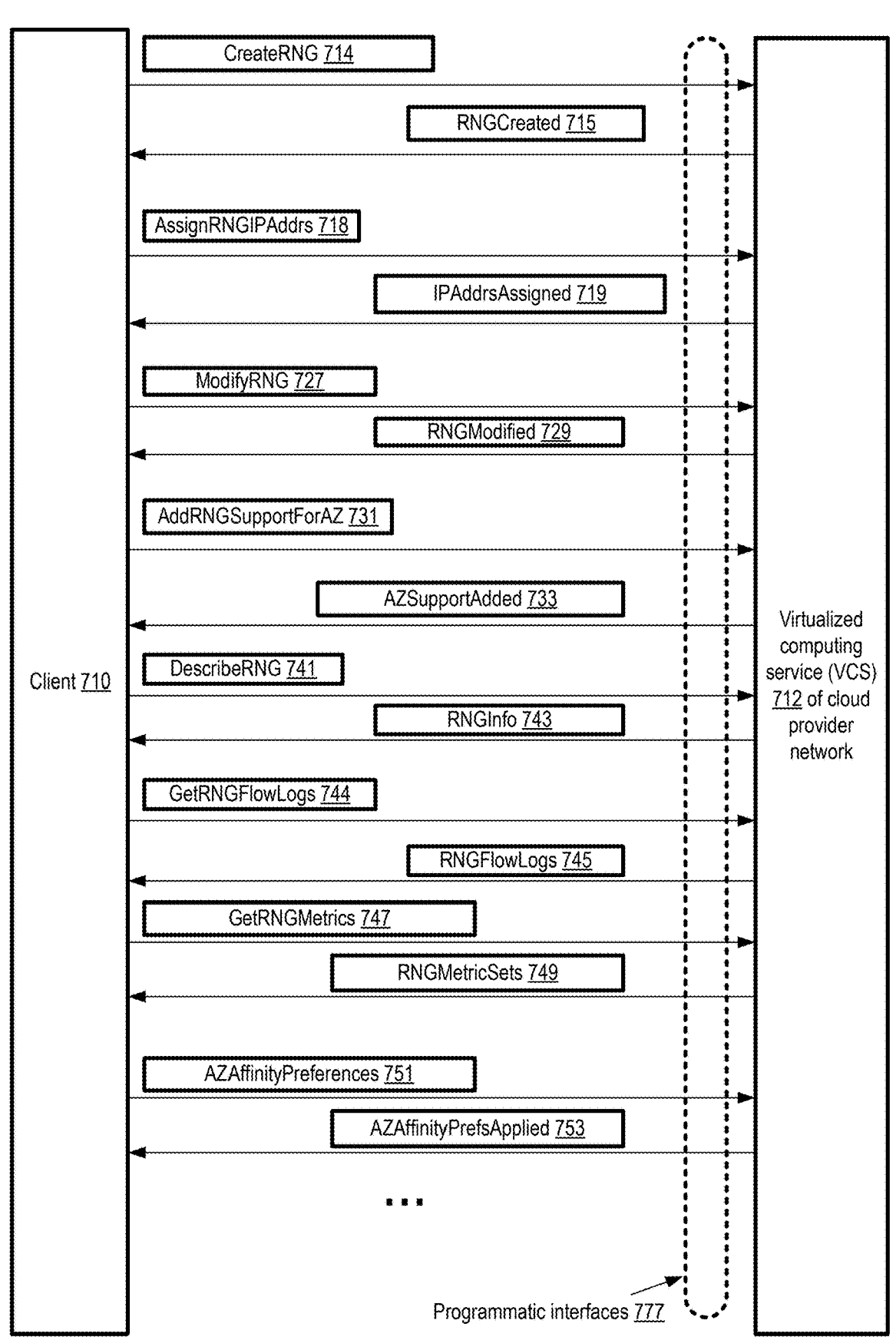
FIG. 7 illustrates example programmatic interactions, associated with configuration and use of RNGs, between a client and a virtualized computing service of a cloud provider network, according to at least some embodiments.

FIG. 7 illustrates example programmatic interactions, associated with configuration and use of RNGs, between a client and a virtualized computing service of a cloud provider network, according to at least some embodiments. A VCS 712, implemented at a cloud provider network similar to CPN 102 of FIG. 1, may implement a set of programmatic interfaces 777 in the depicted embodiment, such as one or more web-based consoles, command-line tools, graphical user interfaces and/or application programming interfaces (APIs). A customer or client 710 of the VCS or the CPN (e.g., an owner or administrator of a VPC in which application resources such as compute instances are set up within various AZs) may utilize the programmatic interfaces to submit requests and information pertaining to RNGs and receive corresponding responses.

Client 710 may submit a CreateRNG request 714 via programmatic interfaces 777, indicating a particular region and a particular VPC for which an RNG is to be created. The requested RNG may be established by a configuration manager, and an RNGCreated response 715 may be sent to the client in the depicted embodiment. In some embodiments, parameters of the CreateRNG request may indicate a list of AZs at which the RNG is expected to be used, or indicate one or more AZs at which the RNG is not expected to be used. In one embodiment, the CreateRNG request may indicate a list of IP addresses (e.g., one or more IP addresses per AZ) that should be used as RNG addresses when performing address translation (addresses which should replace the source IP addresses of compute instances or other ARs during address translation for outbound packets).

In at least one embodiment, instead of or in addition to specifying one or more RNG IP addresses as parameters in a CreateRNG request, a separate AssignRNGIPAddrs request 718 may be sent by a client 710 to the VCS, indicating one or more IP addresses which are to be assigned to a specified RNG in a specified AZ. The IP addresses may be assigned by a configuration manager for use by the RNG during address translation, and an IPAddrsAssigned response message 719 may be sent to the client in some embodiments. In at least one embodiment, the IP addresses chosen by the client may be part of a "white list" of IP addresses with which network endpoints external to the VPC are permitted to communicate.

A ModifyRNG request 727 may be submitted by a client 710 in some embodiments, requesting a change of one or more properties of a specified RNG. The changes requested may for example comprise modifying the set of AZs whose traffic is to be processed using the RNG, modifying the set of IP addresses used, etc. The requested changes may be made by a configuration manager, and an RNGModified message 729 may be sent to the client in some embodiments.

In at least one embodiment, a client may request that RNG support be added for a specified AZ, e.g., by submitting an AddRNGSupportForAZ request 731 specifying an RNG and an AZ for which support is to be added at the RNG. Such a request may be submitted, for example, in a scenario in which the client had earlier explicitly listed the set of AZs for whose ARs the RNG should be used, which may have overridden the feature of automatically adding support for all AZs at an RNG when ARs are added in new AZs. A configuration manager may allocate gateway resources for the specified RNG in the specified AZ, and send an AZSupportAdded response message 733 to the client.

A client 710 may submit a DescribeRNG request 741 to obtain a list of properties of a specified RNG, such as the region and VPC with which the RNG is associated, the list of AZs for whose ARs the RNG is being used, and so on. The properties may be provided to the client via one or more RNGInfo messages 743 in some embodiments.

In at least one embodiment, a set of flow logs may be captured at an RNG, indicating various details of packet flows processed by the RNG, such as the source addresses of VPC ARs whose packet addresses are translated in various AZs, the destinations to which the packets are sent after address translation, the timings of transmissions of packets in one or both directions, and so on. A GetRNG-FlowLogs request 744 may be sent by a client to the VCS to obtain a set of flow logs collected over a specified time range, or a set of flow logs that satisfy specified filtering criteria. The requested flow logs may be sent to the client via one or more RNGFlowLogs messages 745 in the depicted embodiment.

Various metrics pertaining to the operations of RNGs may be collected, e.g., by a monitoring service of the cloud computing environment in some embodiments, such as the rate at which traffic is transmitted in either direction via an RNG in various AZs, changes over time in the number of concurrent connections whose traffic is transmitted via an RNG, the number of IP addresses and ports used at an RNG, and so on. A GetRNGMetrics request 747 may be sent to the VCS in some embodiments to obtain such metrics. The requested metrics may be sent to the client in one or more RNGMetricSets messages 749 in the depicted embodiment.

In at least one embodiment, as mentioned earlier, a zonal affinity policy may be used to guide the selection of RNG resources when performing address translation for ARs in a given AZ. A client may submit an AZAffinityPreferences message 751 in the depicted embodiment, indicating a set of affinity-related rules that the client wishes to have implemented instead of or in addition to default zone affinity policies of the system. A client may, for example, indicate that if RNG resources within a specified AZ AZ1 happen to become unavailable or fail, the packet flows originating at ARs within AZ1 should be transmitted via RNG resources in a specified other AZ AZ2. The affinity-related rules may be applied, and an AZAffinityPrefsApplied message 753 may be sent to the client in the depicted embodiment. In some embodiments, programmatic interactions other than those shown in FIG. 7 may be supported for configuring and using RNGs.

FIG. 8 is a flow diagram illustrating aspects of operations, pertaining to configuration and use of RNGs, which may be performed at a cloud provider network, according to at least some embodiments. As shown in element 801, an RNG RNG1 may be created at a VCS of cloud provider network whose resources are distributed across multiple regions. Individual regions may comprise one or more AZs. RNG1 may be created or established for routing traffic of a VPC VPC1 of a client or customer C1 of the cloud provider network. C1's customer application resources within the VPC, such as compute instances or virtual machines of the VCS, may be distributed across multiple AZs, and the RNG may be set up as a single logical region-level entity that can be used for processing traffic of all the AZs that are being used at the VPC. The customer C1 may not have to request AZ-specific NAT gateways or provide details such as subnets within which the RNG should be set up in the depicted embodiment.

A configuration manager of the VCS may automatically detect when an application resource (AR1) of C1 is activated or launched in a particular AZ AZ1 at which RNG1 resources have not yet been allocated or assigned (element 804). AR1 may, for example, comprise a compute instance, with one or more VNIs with an associated IP address programmatically attached to the compute instance.

Based at least in part on detecting that AR1 has been activated, the configuration manager may automatically allocate AZ1-specific resources RR1 for RNG1 (element 807). At least some of the resources may not be exposed to or accessible by the customer C1 in some embodiments. For example, one or more nodes of an NFVS may be allocated or assigned to RNG1 in AZ1, VNIs may be created for or programmatically attached to RNG1, and/or a set of network addresses which are to be substituted for source addresses of ARs within AZ1 when performing NAT may be chosen for the RNG.

Routing metadata may be automatically generated and stored by the configuration manager if required (element 810), such that network packets sent to a set of destinations (e.g., addresses of devices in the public Internet) from AR1 are transmitted via RNG1 in various embodiments. A determination or assessment as to whether the routing metadata needs to be generated may be made, for example, by analyzing current routing metadata of the VPC and/or one or more properties of AR1 (e.g., whether AR1 already has a public IPv4 address assigned to it) in some embodiments.

RR1 resources may be utilized to cause a particular network address of RNG1 to be set as a source address during a NAT operation performed with respect to a particular packet originating at AR1, prior to the delivery of the packet to its destination in the depicted embodiment (element 813).

Configuration managers of the VCS may automatically expand the set of RNG1 resources to deal with increasing traffic levels of the VPC and/or when new ARs are added in various AZs within VPC1 (element 816) in various embodiments. Similarly, the set of RNG1 resources may be contracted automatically when existing RNG1 capacity is no longer needed (e.g., if VPC1 no longer comprises resources in a given AZ for which RNG resources were dynamically added earlier). In some embodiments, at least by default, zonal affinity may be maintained by utilizing RNG1 resources within the same AZ as the AR whose traffic requires NAT, so that traffic does not have to be sent out of its local AZ just for NAT operations.

It is noted that in various embodiments, some of the operations shown in the flow diagram of FIG. 8 may be implemented in a different order than that shown in the figure, or may be performed in parallel rather than sequentially. Additionally, some of the operations shown in the flow diagram may not be required in one or more implementations.

Figure 9:
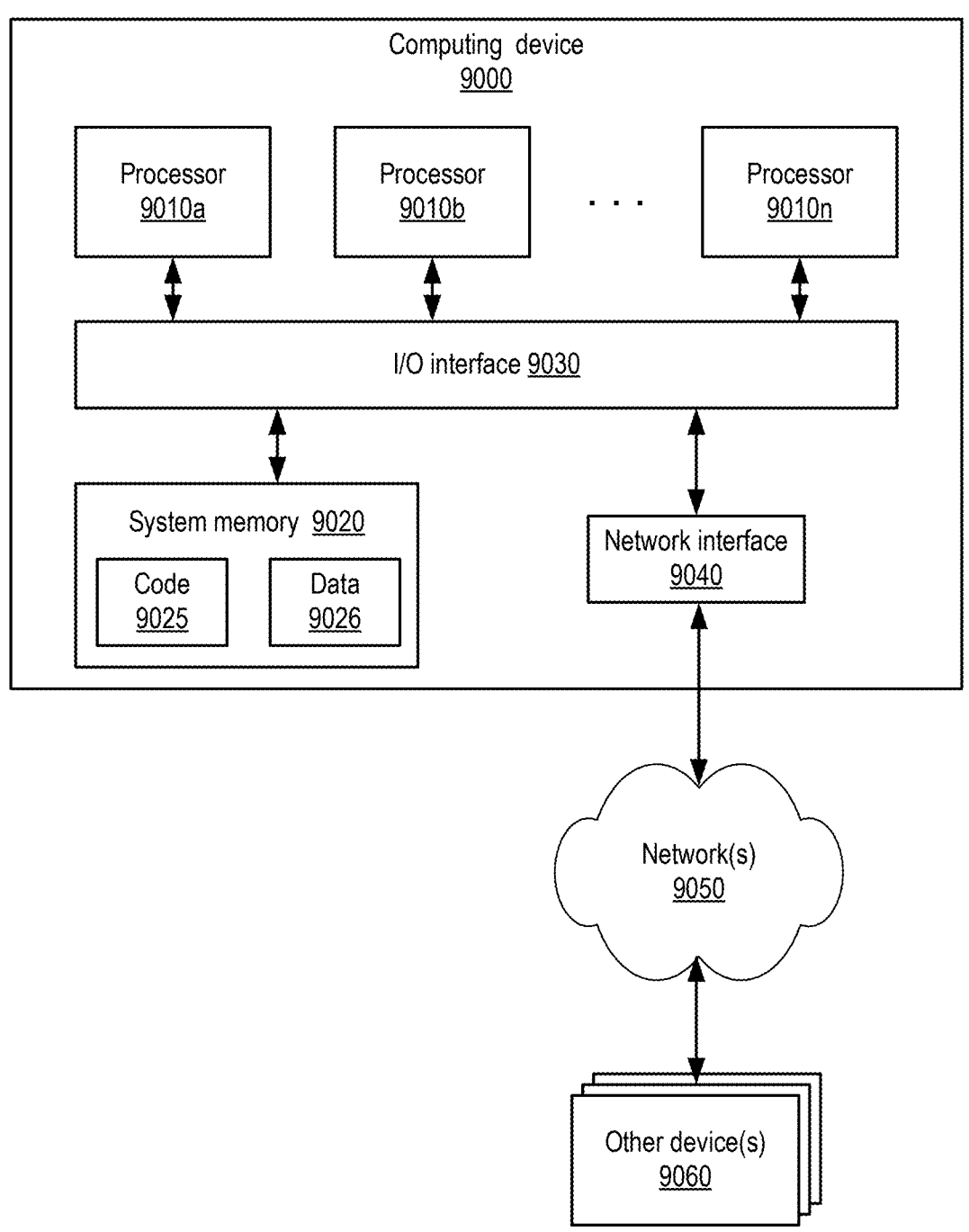
FIG. 9 is a block diagram illustrating an example computing device that may be used in at least some embodiments.

In at least some embodiments, a server that implements the types of techniques described herein (e.g., including the described functionality of various cloud provider network components including configuration managers, NFVS nodes, virtualization servers at which application resources are run, etc.), may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a configuration manager of a cloud computing environment, wherein the cloud computing environment is distributed across multiple geographical regions including a particular region which includes a particular availability zone; and
   a set of servers of the cloud computing environment;
   wherein the configuration manager is configured to:
      create a regional network address translation gateway (RNG) for traffic associated with a virtual private cloud (VPC) of a customer of the cloud computing environment, without requiring the customer to request establishment of availability zone-specific network address translation gateways;
      in response to detecting that (a) a particular application resource has been activated using a server of the set of servers on behalf of the customer, wherein the particular application resource is configured within a private subnet of the VPC, and wherein the private subnet is configured within the particular availability zone, and (b) the RNG does not include resources for processing traffic of the particular availability zone, allocate a set of availability zone-specific network function virtualization resources to the RNG to process traffic of the particular availability zone; and
      cause routing metadata to be generated and stored such that network packets directed to a set of destinations within the public Internet from the particular application resource are sent via the RNG; and
   wherein the RNG is configured to:
      utilize the set of availability zone-specific network function virtualization resources to cause a particular network address of the RNG to be set as a source address of a packet originating at the particular application resource prior to delivery of the packet to a destination of the set of destinations.

2. The system as recited in claim 1, wherein the configuration manager is further configured to:

create the RNG in response to a programmatic request from the customer.

3. The system as recited in claim 1, wherein the configuration manager is further configured to:

receive, via a programmatic interface from the customer, the particular network address of the RNG.

4. The system as recited in claim 1, wherein the configuration manager is further configured to:

based at least in part on one or more metrics associated with traffic of the VPC, automatically allocate additional availability zone-specific resources to the RNG to process traffic of the particular availability zone.

5. The system as recited in claim 1, wherein the configuration manager is further configured to:

determine, prior to generation of the routing metadata, whether a route from the particular application resource to the destination has already been configured, wherein the routing metadata is generated in response to determining that a route from the particular application resource to the destination has not been configured.

6. A computer-implemented method, comprising:

establishing a regional network address translation gateway (RNG) for traffic of a virtual private cloud (VPC) of a customer of a cloud computing environment, wherein the cloud computing environment comprises a set of regions, wherein individual ones of the regions comprise one or more availability zones, and wherein the RNG is associated with a particular region of the set of regions;

in response to detecting that (a) a particular application resource has been activated on behalf of the customer within a particular availability zone of the particular region, wherein the particular application resource is configured within the VPC and (b) the RNG does not include resources for processing traffic of the particular availability zone, allocating a first set of resources to the RNG to process traffic of the particular availability zone; and utilizing the first set of resources of the RNG to cause a particular network address of the RNG to be set as a source address of a packet originating at the particular application resource prior to delivery of the packet to a particular destination.

7. The computer-implemented method as recited in claim 6, further comprising:

generating and storing routing metadata such that network packets directed to the particular destination from the particular application resource are sent via the RNG.

8. The computer-implemented method as recited in claim 7, wherein said storing the routing metadata comprises storing a route table entry in a route table which is not accessible to the customer.

9. The computer-implemented method as recited in claim 6, further comprising:

based at least in part on one or more metrics associated with traffic of the VPC, automatically modifying the first set of resources of the RNG.

10. The computer-implemented method as recited in claim 9, wherein said allocating the first set of resources comprises assigning a first group of nodes of a network function virtualization service of the cloud computing environment to the RNG, and wherein said automatically modifying the first set of resources comprises:

assigning one or more additional nodes of the network function virtualization service to the RNG.

11. The computer-implemented method as recited in claim 9, wherein said allocating the first set of resources comprises assigning a first set of network addresses including the particular network address to the RNG for use in address translation, and wherein said automatically modifying the first set of resources comprises:

assigning one or more additional network addresses to the RNG for use in address translation.

12. The computer-implemented method as recited in claim 9, wherein said automatically modifying the first set of resources comprises:

removing at least one resource from first the set of resources.

13. The computer-implemented method as recited in claim 6, further comprising:

allocating a second set of resources to the RNG to process traffic of application resources of the VPC which are configured in another availability zone;

in accordance with a zonal affinity policy, utilizing the second set of resources of the RNG to perform network address translation for packets originating at application resources in the other availability zone; and utilizing the first set of resources of the RNG to perform network address translation for packets originating at application resources in the particular availability zone.

14. The computer-implemented method as recited in claim 6, wherein said detecting that the particular application resource has been activated comprises one or more of: (a) periodically scanning configuration information of the VPC or (b) subscribing to a stream of VPC configuration change notifications.

15. The computer-implemented method as recited in claim 6, wherein the particular application resource comprises a compute instance of a virtualized computing service of the cloud computing environment.

16. A non-transitory computer-accessible storage medium storing program instructions that when executed on a processor:

establish a regional network address translation gateway (RNG) for traffic of a virtual private cloud (VPC) of a customer of a cloud computing environment, wherein the cloud computing environment comprises a set of regions, wherein individual ones of the regions comprise one or more availability zones, and wherein the RNG is associated with a particular region of the set of regions;

in response to detecting that (a) a particular application resource has been activated on behalf of the customer within a particular availability zone of the particular region, wherein the particular application resource is configured within the VPC and (b) the RNG does not include resources for processing traffic of the particular availability zone, allocate a first set of resources to the RNG to process traffic of the particular availability zone; and utilize the first set of resources of the RNG to cause a particular network address of the RNG to be set as a source address of a packet originating at the particular application resource prior to delivery of the packet to a particular destination.

17. The non-transitory computer-accessible storage medium as recited in claim 16, storing further program instructions that when executed on the processor:

generate and store routing metadata such that network packets directed to the particular destination from the particular application resource are sent via the RNG.

18. The non-transitory computer-accessible storage medium as recited in claim 16, storing further program instructions that when executed on the processor:

based at least in part on one or more metrics associated with traffic of the VPC, automatically modify the first set of resources of the RNG.

19. The non-transitory computer-accessible storage medium as recited in claim 16, storing further program instructions that when executed on the processor:

receive, from the customer via a programmatic interface, the particular network address.

20. The non-transitory computer-accessible storage medium as recited in claim 16, wherein the particular destination comprises one of: (a) a destination in the public Internet, (b) a destination in another VPC, or (c) a destination in a premise of the customer.

* * * * *